United States Patent [19]

Hagander

[11] Patent Number: 5,746,802
[45] Date of Patent: May 5, 1998

[54] METHOD AND DEVICE FOR COMPOSTING ORGANIC MATTER

[76] Inventor: Bertil Hagander, Fotbollsvägen 5, S-615 33 Valdemarsvik, Sweden

[21] Appl. No.: 669,421

[22] PCT Filed: Jan. 26, 1995

[86] PCT No.: PCT/SE95/00066

§ 371 Date: Jul. 9, 1996

§ 102(e) Date: Jul. 9, 1996

[87] PCT Pub. No.: WO95/20555

PCT Pub. Date: Aug. 3, 1995

[30] Foreign Application Priority Data

Jan. 28, 1994 [SE] Sweden .................. 9400272

[51] Int. Cl.[6] ............................................. C05F 11/08
[52] U.S. Cl. ..................... 71/9; 71/10; 435/290.1; 435/290.4
[58] Field of Search ............. 435/290.1, 290.4; 71/9, 10, 11

[56] References Cited

U.S. PATENT DOCUMENTS

| 4,184,269 | 1/1980 | Kneer ........................... 34/168 |
| 4,236,910 | 12/1980 | Norin et al. ...................... 71/9 |
| 5,139,554 | 8/1992 | Johnson ............................ 71/9 |

FOREIGN PATENT DOCUMENTS

| 75335 | 2/1988 | Finland . |
| 2426536 | 2/1983 | Germany . |
| 4114160 | 5/1992 | Germany .................. 435/290.4 |

*Primary Examiner*—Ferris Lander
*Attorney, Agent, or Firm*—Beveridge, DeGrandi, Weilacher, & Young, LLP

[57] ABSTRACT

In a method for composting organic material, the material to be composted is placed, in disintegrated form, in a container. The material to be composted is introduced into the inner, lower part of an accumulation of disintegrated material which was previously introduced into the container. The material introduced into the container is then degraded biologically in zones which, are moved upwards as additional disintegrated material is being introduced into the container. Finally composted material is withdrawn from the upper part of the accumulation of material. A device for carrying out the method has a container and a material feed unit. The material feed unit has a feed tube with an outlet end which opens centrally in the lower part of the container, a material inlet communicating with the feed tube to receive the material to be composted, and a press for pressing the material in the feed tube toward the outlet end of the feed tube.

18 Claims, 5 Drawing Sheets

5,746,802

1

METHOD AND DEVICE FOR COMPOSTING ORGANIC MATTER

This case is a 371 of PCT/SE95/00066 filed on Jan. 26, 1995.

The present invention relates to a method for composting organic material, especially domestic waste, in which method the material to be composted is placed in disintegrated form in a container to be biologically degraded under the influence of degradative organisms. The invention also relates to a device for carrying out this method.

A growing interest in ecology and a resulting increased environmental concern have entailed that biological, cyclic processes are being used to an ever greater extent as an alternative to dumping and burning waste. Composting of domestic waste and garden waste, i.e. composting on a relatively small scale, has become increasingly common.

In a known method for composting domestic waste and garden waste, the waste is placed in disintegrated form in a container. The waste is inserted through the top of the container as it is produced, which in the case of domestic waste often means that a fairly small charge of waste is placed in the container almost every day. Therefore, the waste placed in the container has attained a varying degree of decay. The farther down in the container the waste is located, the farther it has proceeded in the composting process. Finally composted material is therefore withdrawn from the lower part of the container, which is a quite troublesome operation. Moreover, since water present in the waste and introduced into the container along with it, and water otherwise introduced into the container collect in the lower part thereof, the finally composted material often is in the form of a difficultly-handled, wet sludge.

One object of the present invention therefore is to provide a method for composting organic matter, especially domestic waste, which makes it considerably easier to withdraw finally composted material and which also provides a quick composting process.

According to the invention, this object is achieved by a method which is of the type stated by way of introduction and is characterised in that the disintegrated material is placed in the container by being introduced into the inner, lower part of an accumulation, located in the container, of disintegrated material previously introduced therein, to be degraded in zones which, as disintegrated material is being introduced into the container, are moved upwards therein, whereupon finally composted material can be withdrawn from the upper part of the accumulation of material.

If required, air is introduced into the container in the lower part thereof.

Another object of the invention is to provide a simple device for carrying out this method.

According to the invention, this object is achieved by a device which is characterised by a container and a material feed unit having a feed tube, one end of which opens substantially centrally in the container in the lower part thereof, a material inlet communicating with the feed tube and adapted to receive the material to be composted, and a press means for pressing the material introduced into the feed tube via the inlet, towards said one end of the tube.

A disintegrating means is preferably arranged in the feed tube in order, by cooperating with the press means, to tear or cut into pieces large pieces of material which have been introduced into the feed tube via the inlet. The disintegrating means suitably consists of a knife projecting into the feed tube and extending transversally thereof.

In a preferred embodiment, the knife projects into the feed tube by a substantially sawtooth-shaped cutting edge,

2 and the press means has a plunger movable back and forth in the feed tube and having a surface designed for cooperation with the knife cutting edge and formed with longitudinal grooves giving this surface a cross-sectional shape corresponding to the shape of the substantially sawtooth-shaped knife cutting edge.

In its front portion, the plunger preferably has a V-shaped recess for cutting interaction with the knife.

A distributing means for distributing and loosening the material which is pressed into the container is preferably provided in the container in the vicinity of said one end of the feed tube.

The invention will now be described in more detail in an embodiment thereof with reference to the accompanying drawings.

Figure 1:
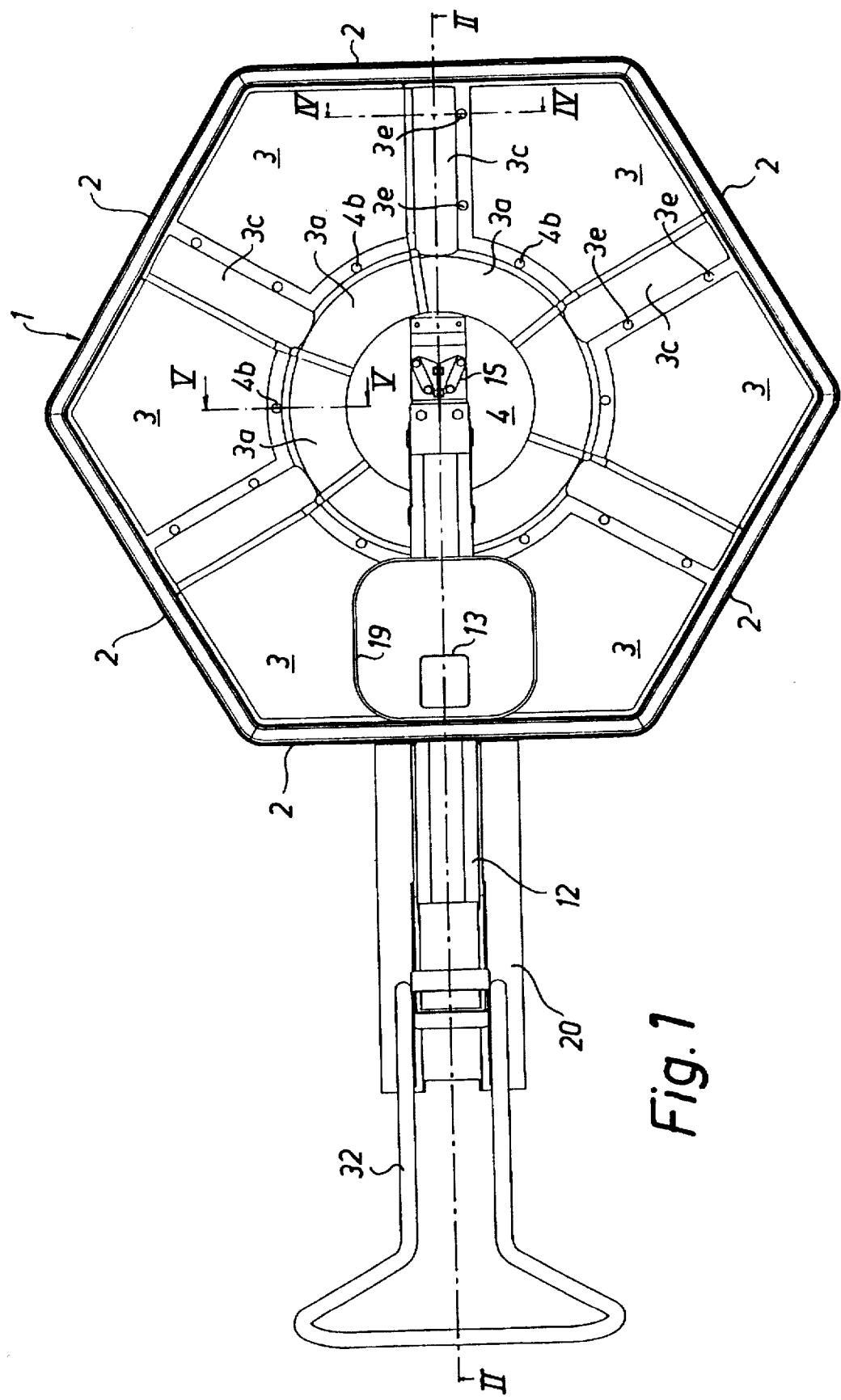
FIG. 1 shows a preferred embodiment of a device according to the invention from above and with no cover thereon.

The device shown in the drawings comprises a container 1 having six side walls 2 and a horizontal cross-section in the form of a regular hexagon. The container 1 further has a bottom made up of six identical piece-of-cake-like, outer bottom members 3 and a circular, inner bottom member 4. The bottom members 3 and 4 are joined together as described in more detail below so as to form the bottom of the container 1. The container 1 also has a removable cover 5.

The inner bottom member 4 consists of a circular sheet of plastics, having in the vicinity of its periphery a circumferential ridge portion 4a of U-shaped cross-section. Outside the ridge portion 4a, the inner bottom member 4 has six pin-shaped, raised portions 4b evenly distributed along the periphery.

Figure 3:
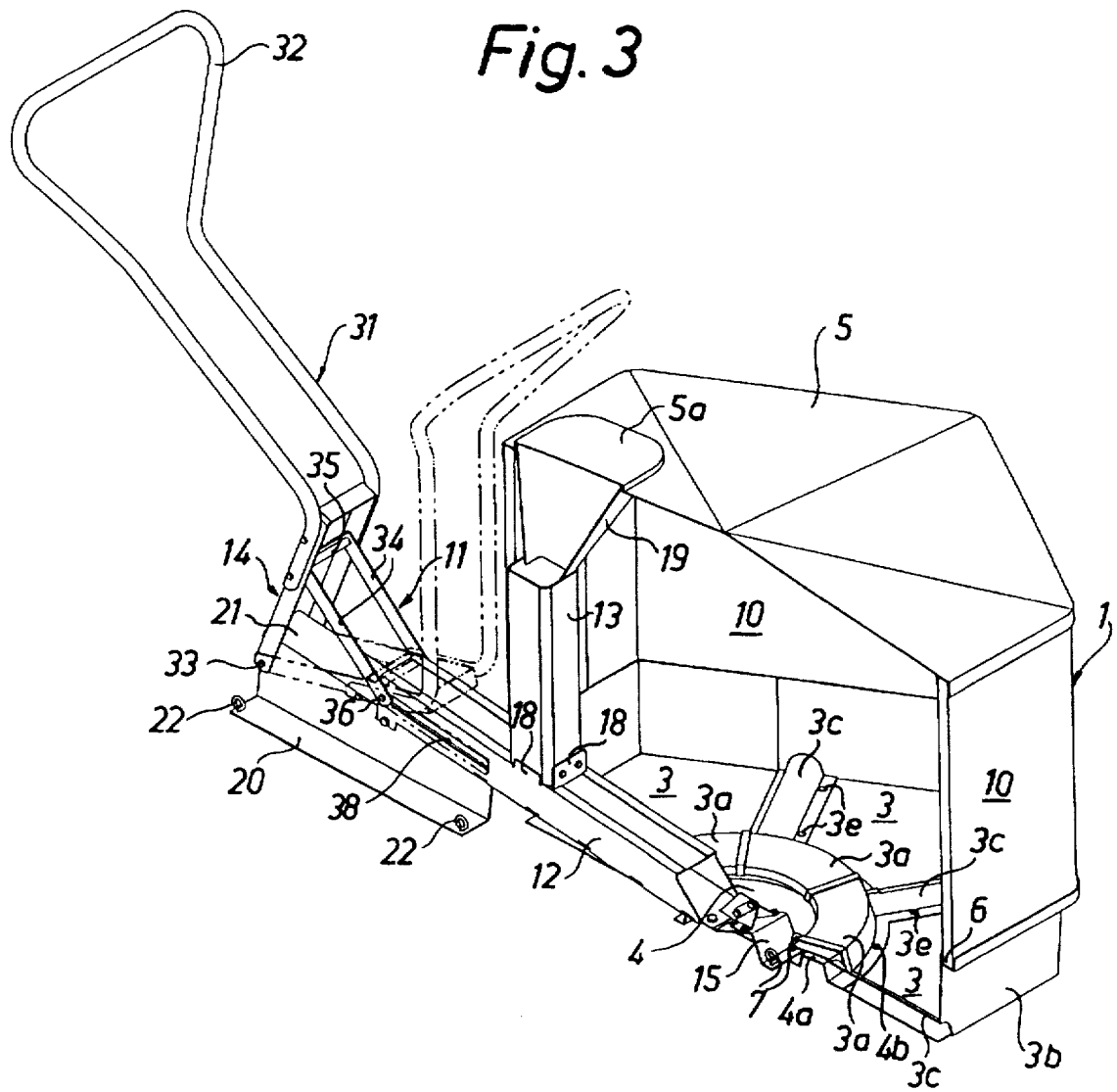
FIG. 3 shows the device in perspective and partly in a section taken along line II—II in FIG. 1.

The outer bottom members 3, also made of plastics, have at their inner ends a circular-arc-shaped ridge portion 3a having substantially the same radius as the ridge portion 4a of the inner bottom member 4. The ridge portion 3a of each outer bottom member 3 forms a downwardly open channel of U-shaped cross-section. Each outer bottom member 3 has at its outer end a vertically upwardly extending flange 3b, which consists of two parts angled 120° in relation to each other and having an upwardly open groove 6 extending along the upper edge of the flange parts. One flange part of each outer bottom member 3 forms, together with the other flange part of the adjacent outer bottom member 3, the lower portion of one of the six side walls 2 of the container 1. Each outer bottom member 3 is provided, at one of its "radial" side edges, with a ridge portion 3c extending along this edge and forming a downwardly open channel which has a rounded U-shaped cross-section and extends into the channel formed by the circular-arc-shaped ridge portion 3a at its inner end. As shown in FIG. 3, the channel formed by the radial ridge portion 3c extends through the flange 3b and, thus, communicates at its outer end with the surroundings of the container 1. Each outer bottom member 3 has two holes 3d provided at the above-mentioned radial side edge inwardly of the ridge portion 3c, two pin-shaped raised portions 3e provided at its other radial side edge, and a hole 3f provided at its inner end radially outwardly of the circular-arc-shaped ridge portion 3a.

The bottom members 3 and 4 are placed on a horizontal base which, in the illustrated example and in the typical case of use, is the ground. The inner bottom member 4 is fixed to the ground by means of anchoring nails 7. Each outer bottom member 3 is designed as a relatively fine-meshed netting in its portion located between the circular-arc-shaped ridge portion 3a, the radial ridge portion 3c, the raised portions 3d and the flange 3b. In its portion located inside the ridge portion 4a, the inner bottom member 4 is also designed as a relatively fine-meshed netting. The relatively fine-meshed nettings however have such a large mesh width that worms, which are essential to the composting process, can pass therethrough.

Figure 4:
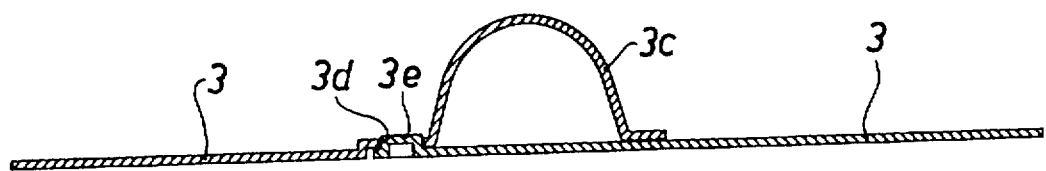
FIG. 4 is a sectional view taken along line IV—IV in FIG. 1 and showing two bottom members in a container.
Figure 5:
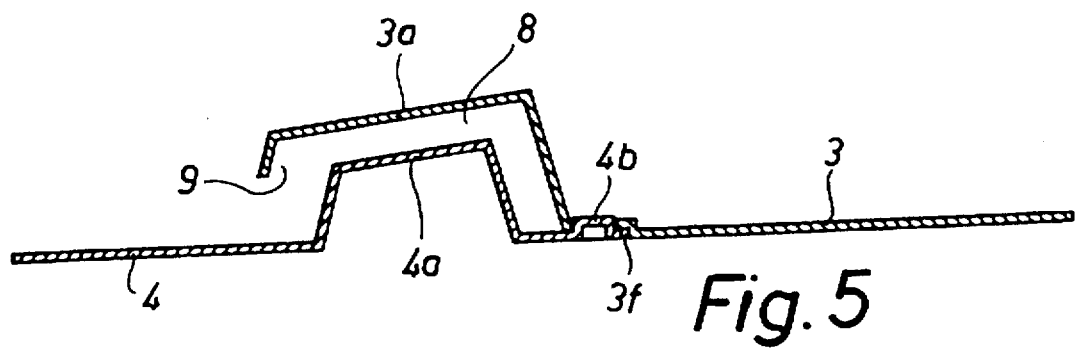
FIG. 5 is a sectional view taken along line V—V in FIG. 1 and showing two other bottom members in the container.

The radial ridge portion 3c of each outer bottom member 3 is so positioned above the radial side edge, provided with raised portions 3e, of a nearby outer bottom member 3 that these raised portions 3e engage in the holes 3d (see FIG. 4). The circular-arc-shaped ridge portion 3a of each outer bottom member 3 is so positioned over the circular ridge portion 4a of the inner bottom member 4 that the raised portions 4b of the inner bottom member engage in the holes 3f of the respective outer bottom members 3 (see FIG. 5). The ridge portions 3a and 4a are so dimensioned and designed that a circumferential gap 8 having a substantially radially inwardly directed opening 9 exists between the ridge portions 3a, on the one hand, and the ridge portion 4a, on the other. Air is introduced into the interior of the container 1 through the channels formed by the radial ridge portions 3c and communicating with the surroundings, and through the circumferential gap 8 and the gap opening 9.

The upper portion of each of the six side walls 2 of the container 1 is formed by a rectangular wall panel 10. The panels 10 are placed in the grooves 6 of the respective pairs of flange parts and are connected to each other in the corners of the container 1 along their vertical side edges by means of conventional tongue-and-groove joints (not shown). Each wall panel 10 consists of two outer layers of plastics material and an intermediate layer of heat-insulating material.

The cover 5, which is placed on the upper edges of the wall panels 10, is made of plastics material and is in the form of a fine-meshed netting protecting against torrential rain but letting through water from ordinary rainfall.

Furthermore, the device has a material feed unit 11 with a feed tube 12, an inlet tube 13 and a press means 14.

The feed tube 12 is made of sheet metal and has rectangular cross-section. The tube 12 extends through a side wall 2 into the container 1, in which it is supported at its inner end by the inner bottom member 4 via a distributing means 15, which will be described in more detail below and which is fixed to the inner bottom member 4 by the nails 7. The tube 12 extends through a hole 16 in the vertical flange 3b of an outer bottom member 3. The tube 12 is slightly inclined in relation to the horizontal plane and, in the illustrated example, slopes 5°–10° down towards the centre of the container 1. The inner end of the tube 12 is bevelled about 45° in relation to the longitudinal axis of the tube and thus forms an upwardly-inwardly open material discharge opening.

Inwardly of the above-mentioned side wall 2 of the container 1, the feed tube 12 has a substantially square inlet opening 17 formed in the upper tube wall and surrounded by four vertical flanges 18 connected to the tube 12. The inlet tube 13, made of plastics and having substantially square cross-section, is located between the flanges 18 and is so fixed thereto that its lower end, which is bevelled in correspondence with the inclination of the feed tube 12, is located on a level with the upper wall of the tube 12. At its upper end, the inlet tube 13 has provided thereon a feed hopper 19 of plastics, which is located immediately underneath the cover 5. The cover 5 has an easily openable door 5a positioned immediately above the inlet tube 13 and the hopper 19.

Outside the container 1, the feed tube 12 rests on a ramp element 20 in the form of a bent element of sheet metal, having an upper ramp surface 21, whose inclination corresponds to that of the feed tube 12. The ramp element 20 is fixed to the base (the ground) by anchoring nails 22.

Figure 8:
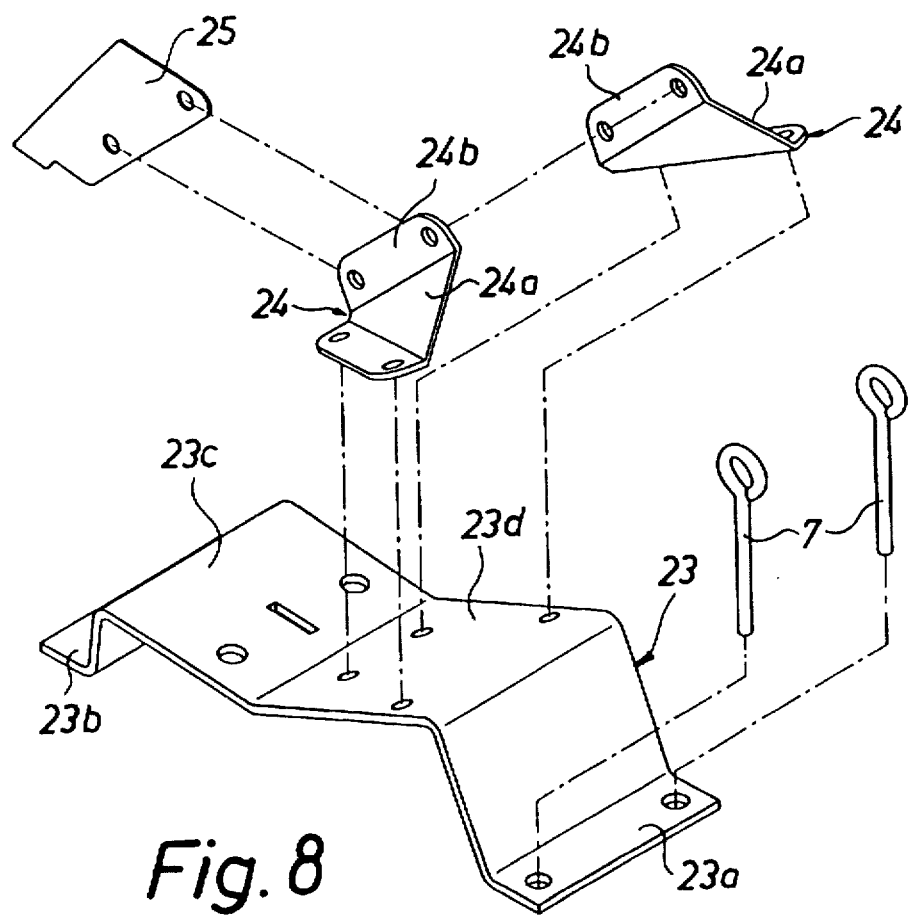
FIG. 8 is an exploded view showing a distributing means.

In the illustrated embodiment, the distributing means 15 consists of four metal elements (see FIG. 8), namely a support element 23, two lifting elements 24 and a knife element 25. The support element 23 consists of a sheet-metal element bent along five parallel lines and having two horizontal end portions 23a and 23b, which rest on the inner bottom member 4 and one 23a of which is fixed thereto by the nails 7 which are driven into the base (the ground) via the inner bottom member 4. The other horizontal portion 23b is located underneath the feed tube 12. Furthermore, the support element 23 has an inclined portion 23c, the inclination of which corresponds to that of the feed tube 12. At its inner end, the feed tube 12 rests on the portion 23c and is fixed thereon by screws. The support element 23 also has a portion 23d directly connecting with the portion 23c and inclined in the opposite direction with respect thereto. The two lifting elements 24 are fixed on the portion 23d by screws. Each of the lifting elements 24 has an obliquely upwardly-outwardly facing lifting surface 24a. The knife element 25 is clamped between two vertical flanges 24b on the lifting elements 24, these flanges being clamped together by means of screws. The two lifting elements 24 are symmetrically positioned with respect to the vertical central plane of the feed tube 12, in which plane the knife element 25 thus is located.

Figure 2:
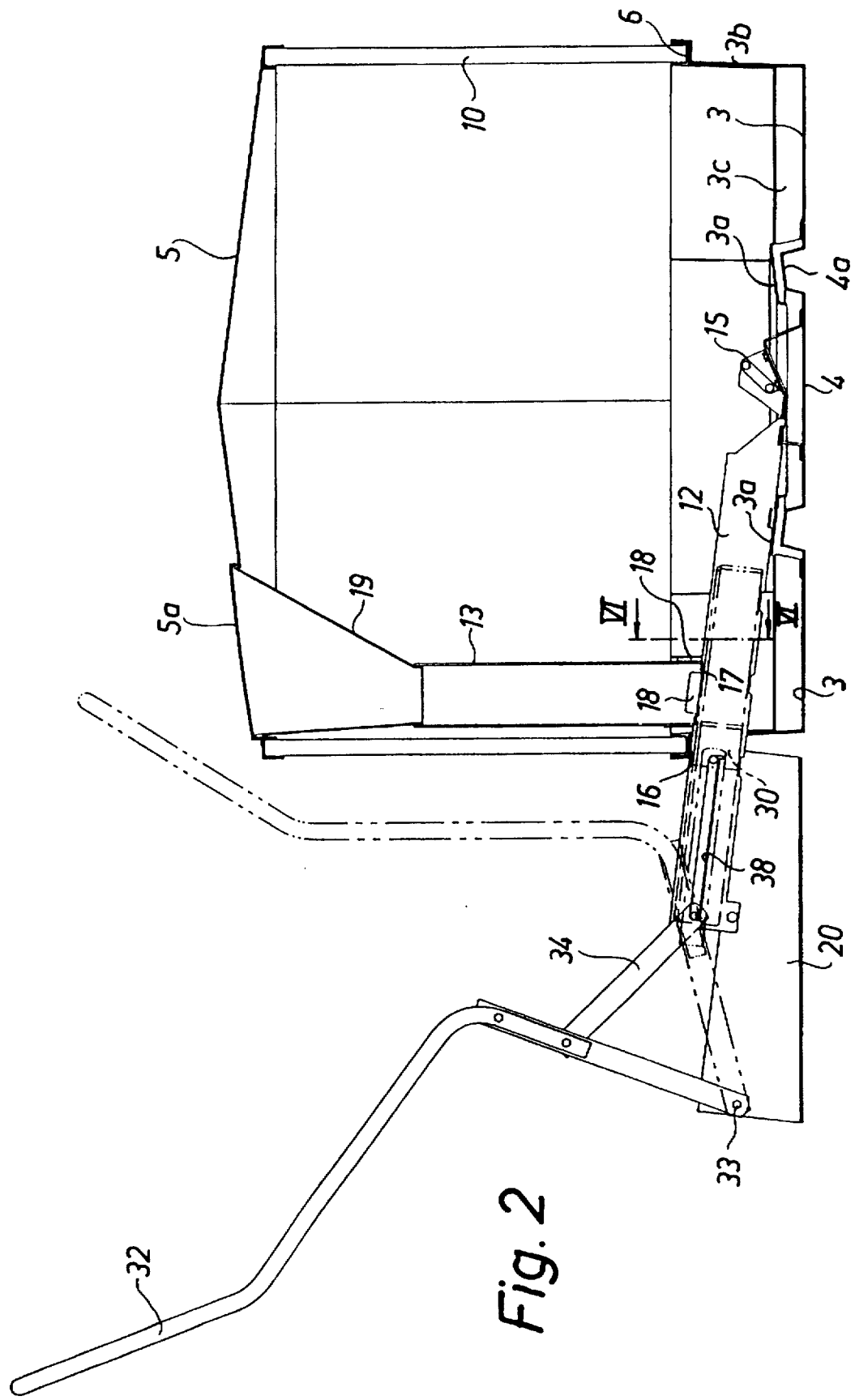
FIG. 2 shows the device partly in a section taken along line II—II in FIG. 1, but with the cover in place on the device.

The press means 14 comprises a plunger 30 which is movable back and forth in the feed tube 12 between a rear end position, which is indicated by dashed lines in FIG. 2 and in which the forward end of the plunger 30 is located outside the inlet opening 17, and a front end position, which is indicated by dash-dot lines in FIG. 2 and in which the forward end of the plunger 30 is located inwardly of the inlet opening 17 at a distance from the inner end of the feed tube 12.

The press means 14 also includes an operating device 31 having a lever 32 which is pivotally connected to the ramp element 20 about a horizontal shaft 33. The lever 32 is pivotable between a rear position, indicated by full lines in FIGS. 2 and 3, and a front position, indicated by dash-dot lines in FIGS. 2 and 3. Two link arms 34 are articulated about a common, horizontal shaft 35 to the lever 32 at one end, and articulated about a common, horizontal shaft 36 to the plunger 30 at the other end. The shaft 36 extends through a hole 37 in the rear portion of the plunger 30 and protrudes on each side of the feed tube 12 through a guide slot 38 which is provided in each side wall of the tube 12 and extends a certain distance along the tube 12 in its portion located outside the container 1. When the lever 32 is in its rear position, the shaft 36 engages the rear end wall of the slots 38, the plunger 30 being in its rear end position, and when the lever 32 is in its front position, the shaft 36 engages the front end wall of the slots 38, the plunger 30 being in its front end position (see FIGS. 2 and 3).

The plunger 30 comprises a bent sheet-metal element 39 having U-shaped cross-section, the web portion of the U facing upwards. This web portion is formed with grooves 40 having V-shaped cross-section and extending in the longitudinal direction of the plunger 30. Moreover, the plunger 30 has a front piece 41 of metal, which is V-shaped as viewed from above and which is welded to the element 39 so as to form the front portion of the plunger 30. The apex of the front piece 41 faces the element 39, such that the plunger 30 has a V-shaped recess in its front portion, as viewed from above. In its top surface, the front piece 41 has a plurality of grooves 42, having the same cross-sectional shape as the grooves 40 in the web portion of the element 39 and forming an extension of these grooves.

Figure 6:
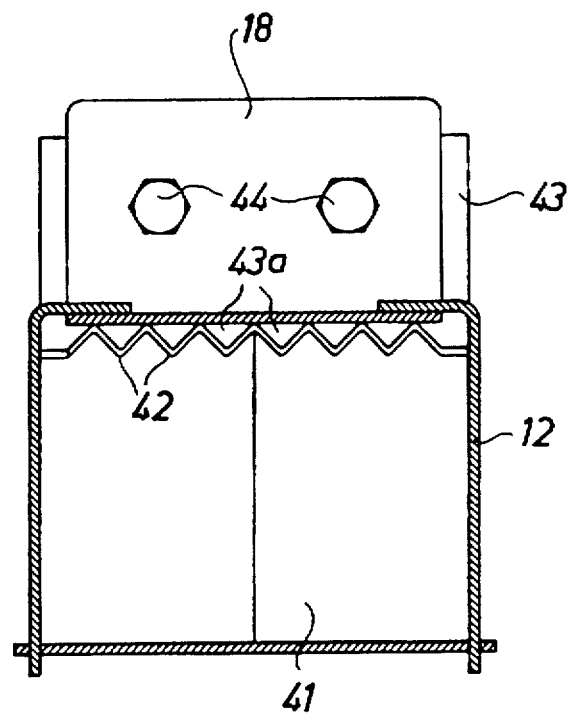
FIG. 6 is a sectional view taken along line VI—VI in FIG. 2 and showing a feed tube, a plunger arranged therein and a disintegrating means.
Figure 7:
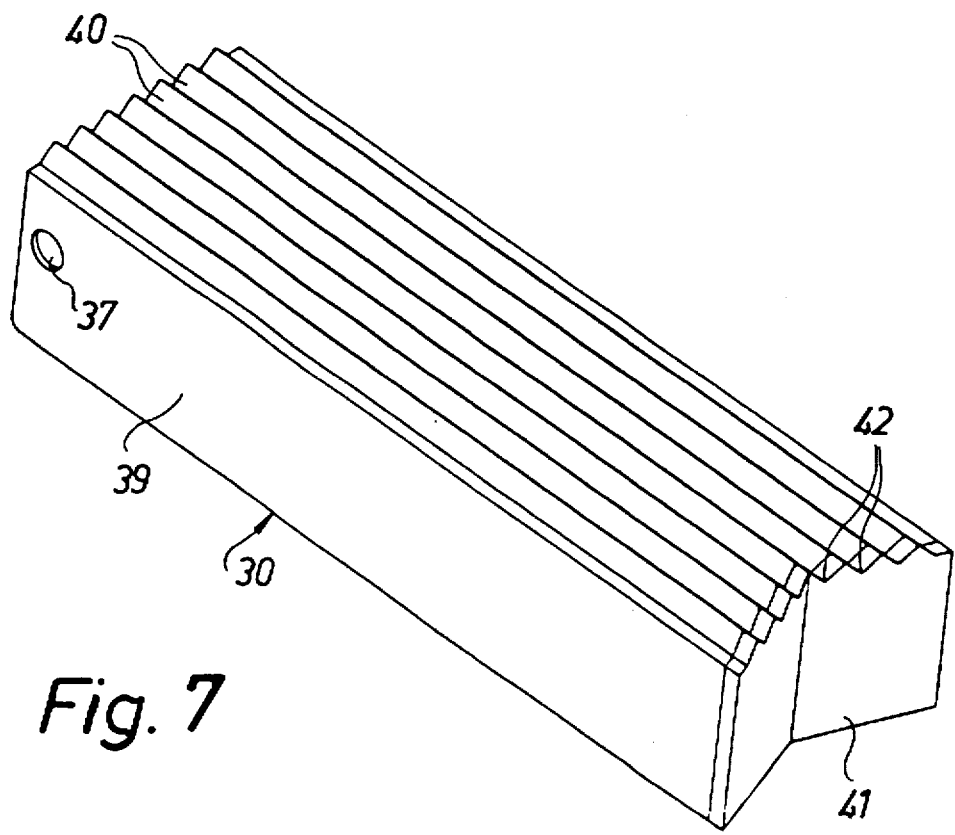
FIG. 7 shows the plunger in perspective.

A knife 43, having the shape of a rectangular metal plate, is provided at one of its side edges with a sawtooth-shaped cutting edge 43a. The knife 43 is so mounted by means of screws 44 on the front flange 18 of the feed tube 12 between this flange and the inlet tube 13 as to extend transversally of the feed tube 12 with the cutting edge 43a located in the upper portion thereof. The sawteeth of the cutting edge 43a have the same shape as the grooves 40 and 42 in the element 39 and the front piece 41 of the plunger 30, respectively, for engaging in these grooves (see FIG. 6).

When organic material to be composted, such as domestic waste, is to be fed into the device, the door 5a provided in the cover 5 is opened, and the material is deposited in the hopper 19. The plunger 30 then is in its rear end position, to which it has been moved by pivoting the lever 32 to its rear position. If so required, the material present in the inlet tube 13 and the hopper 19 is pressed down into the feed tube 12, whose inlet opening 17 is open when the plunger 30 is in its rear end position, by means of a rod (not shown). The lever 32 is then pivoted forwards to its front position, moving the plunger 30 to its front end position. When the plunger 30 is moved forwards, it cooperates with the knife 43 in order to separate, from the column of material standing in the inlet tube 13, a plug of material which corresponds to the cross-section of the feed tube 12 and which is driven forwards in the feed tube 12. The material is then disintegrated in such a manner that large pieces of material introduced into the feed tube 12 are torn or cut into pieces by the cooperation of the plunger 30 with the knife 43, and that certain components, such as plant fibres, in the material are squeezed and crushed during the pushing forwards of the plug of material in the feed tube 12. This disintegration of material is essential for achieving a quick composting process. In its front end position, the plunger 30 is so spaced from the front or inner end of the feed tube 12 that the plug of material does not reach the discharge opening of the feed tube 12 in the first piston stroke described, but is merely pressed forwards abutting on two or three plugs of material which have previously been pressed into the feed tube 12 and still remain therein. These two or three plugs of material provide an increased resistance to the plunger 30 during its displacement towards the front end position, which promotes the aimed-at crushing and, thus, the disintegration of the material. The lever 32 is swung back and forth to produce several piston strokes until all the material in the above-mentioned column of material has been compacted into plugs of material.

For each forward piston stroke produced by pivoting the lever 32 from its rear position to its front position, a plug of material is pressed into the feed tube 12 at the same time as the foremost plug of material present in the feed tube is discharged from the front end thereof. The plug of material discharged is then cleaved by the knife element 25, whereupon the two partial plugs of material resulting from the cleaving abut on the lifting surfaces 24a of the respective lifting elements 24 to be lifted obliquely upwards-outwards. As a result, the material will be distributed and loosened in an appropriate way when being introduced into the container 1. The material to be composted is introduced into the manner described above in the central, lower part of the container 1 and, hence, in an accumulation of composting material which has earlier been introduced into the container 1 and which, when starting up the device, may be a heap of earth which has been inserted directly in the container 1 after removal of the cover 5 and which well covers the front end of the feed tube 12 and the inner bottom member 4. As new material is introduced from below into the accumulation of material in the container 1, the previously-introduced material is moved upwards and to some extent outwards in the container 1. The disintegrated material introduced into the container 1 is thus degraded in zones which are moved upwards in the container 1 as new material is being introduced therein through the feed tube 12. The higher a zone is located in the container 1, the further the composting process has proceeded in this zone. The finally composted material, which is in a relatively dry state, may after removal of the cover 5 be taken out from the upper part of the accumulation of material.

The biological degradation of the material in the different zones, between which there are of course no clear boundaries, takes place under the action of degradative organisms, such as thermophilic, mesophilic and psychrophilic microorganisms, different species of fungi, worms, woodlice etc, which are especially active in different zones depending on the temperature, humidity and air conditions prevailing in the respective zones.

The invention may be modified in many different ways within the scope of the appended claims. The device described above is especially well suited for use in private-house gardens for composting domestic waste and garden waste. The device and the method described above may, for example, be modified for use on a larger scale, i.e. for composting waste from several households in one or more rental buildings. In the device described, the press means is operated manually, but when using the invention on a larger scale, the device may suitably include a motor-powered press means and a means for providing controlled supply of air to the container.

I claim:

1. A method of composting organic material, especially domestic waste, in which method the material to be composted is placed in disintegrated form in a container (1) to be biologically degraded under the influence of degradative organisms, said container having an upper zone and a lower zone which is vertically and colinearly positioned below the upper zone, characterised in that the disintegrated material is placed in the container (1) by being introduced into the central region of the lower zone of an accumulation, located in the container, of disintegrated material previously introduced therein, to be degraded in zones which, as disintegrated material is being introduced into the container, are moved upwards and outward from said central region, whereupon finally composted material is withdrawn from the upper zone of the accumulation of material, said inner lower zone of the container being laterally surrounded by the previously introduced accumulation of material.

2. A method as claimed in claim 1, characterised in that air is introduced into the container (1) in the lower zone thereof.

3. A device for carrying out the method as claimed in claim 1, characterised by a container (1) which has an upper zone and a lower zone which is vertically and colinearly positioned below the upper zone, a material feed unit (11) having a feed tube (12), one end of which opens substantially into a central region of the lower zone of the container (1), a material inlet (13, 17) communicating with the feed tube (12) and adapted to receive the material to be composted, said container having side walls which are laterally spaced from the material inlet, and a press means (14) for pressing the material introduced into the feed tube (12) via the inlet (13, 17), towards said one end of the tube (12).

4. A device as claimed in claim 3, characterised in that a disintegrating means (43) is provided in the feed tube (12) in order, by cooperating with the press means (14), to tear or cut into pieces large pieces of material which have been introduced into the feed tube (12) via the inlet (13, 17).

5. A device as claimed in claim 4, characterised in that the disintegrating means consists of a knife (43) projecting into the feed tube (12) and extending transversally thereof.

6. A device as claimed in claim 5, characterised in that the knife (43) projects into the feed tube (12) by a substantially sawtooth-shaped cutting edge (43a), and that the press means (14) has a plunger (30) movable back and forth in the feed tube (12) and having a surface designed for cooperation with the knife cutting edge and formed with longitudinal grooves (40, 42) giving this surface a cross-sectional shape corresponding to the shape of the substantially sawtooth-shaped knife cutting edge (43a).

7. A device as claimed in claim 6, characterised in that the plunger (30) in its front portion (41) has a V-shaped recess for cutting interaction with the knife (43).

8. A device as claimed in claim 3, characterised in that a distributing means (15) for distributing and loosening the material which is pressed into the container (1) is provided in the container in the vicinity of said one end of the feed tube (12).

9. A device as claimed in claim 4, characterised in that a distributing means (15) for distributing and loosening the material which is pressed into the container (1) is provided in the container in the vicinity of said one end of the feed tube (12).

10. A device as claimed in claim 5, characterised in that a distributing means (15) for distributing and loosening the material which is pressed into the container (1) is provided in the container in the vicinity of said one end of the feed tube (12).

11. A device as claimed in claim 6, characterised in that a distributing means (15) for distributing and loosening the material which is pressed into the container (1) is provided in the container in the vicinity of said one end of the feed tube (12).

12. A device as claimed in claim 7, characterised in that a distributing means (15) for distributing and loosening the material which is pressed into the container (1) is provided in the container in the vicinity of said one end of the feed tube (12).

13. A method for composting organic material, said method including the steps of:

providing a container which contains a previously introduced accumulation of material which is being composted, said container having an upper zone and a lower zone which is vertically and colinearly positioned below the upper zone;

introducing additional organic material into an inner area of said lower zone of said accumulation of material to move the accumulation of material upward in the container, said additional organic material being inserted into a central region of the lower zone where it is laterally surrounded by the previously introduced accumulation of material; and withdrawing from said upper zone of the accumulation of material a finally composted portion of said accumulation of material.

14. A method according to claim 13 including the step of pressing the additional organic material before introducing it into the accumulation of material.

15. A method according to claim 14 including the steps of loosening and distributing additional organic material after it has been pressed.

16. A method according to claim 14 in which the additional organic material is pressed by placing it in a feed tube and pressing it with a plunger which moves in said feed tube.

17. A method according to claim 13 wherein the organic material initially contains large pieces, said method including the step of tearing said large pieces into smaller pieces before introducing them as said additional organic material into the accumulation of material.

18. A method according to claim 13 wherein the organic material initially contains large pieces, said method including the step of cutting said large pieces into smaller pieces before introducing them as said additional organic material into the accumulation of material.

* * * * *